United States Patent
Gerez et al.

(10) Patent No.: US 12,507,989 B2
(45) Date of Patent: Dec. 30, 2025

(54) ACOUSTIC COUPLING DEVICE AND METHOD OF USING THE DEVICE

(71) Applicant: RESPINOR AS, Oslo (NO)

(72) Inventors: David Gerez, Oslo (NO); Marit Mellemseter, Oslo (NO); Jessica Thomasson, Oslo (NO)

(73) Assignee: Respinor AS, Oslo (NO)

( * ) Notice: Subject to any disclaimer, the term of this patent is extended or adjusted under 35 U.S.C. 154(b) by 157 days.

(21) Appl. No.: 17/899,226

(22) Filed: Aug. 30, 2022

(65) Prior Publication Data

US 2024/0065672 A1  Feb. 29, 2024

(51) Int. Cl.
*A61B 8/00* (2006.01)

(52) U.S. Cl.
CPC .................................. *A61B 8/4281* (2013.01)

(58) Field of Classification Search
CPC .... A61B 8/4281; A61B 8/4236; A61B 8/4222
See application file for complete search history.

(56) References Cited

U.S. PATENT DOCUMENTS

| | | | |
|---|---|---|---|
| 9,211,106 B2 | 12/2015 | Berard-Andersen et al. | |
| 10,398,351 B1 | 9/2019 | Eriksen et al. | |
| 10,505,821 B2 | 12/2019 | Tanoue et al. | |
| 11,724,130 B2 * | 8/2023 | Lewis, Jr. | A61N 7/00 601/2 |
| 2002/0068871 A1 * | 6/2002 | Mendlein | A61B 8/4209 600/459 |
| 2008/0200810 A1 * | 8/2008 | Buchalter | A61B 8/4236 600/459 |
| 2010/0292576 A1 * | 11/2010 | Krispi | A61B 8/4236 600/459 |
| 2015/0231415 A1 * | 8/2015 | Lewis, Jr. | A61B 8/4236 601/2 |
| 2015/0320387 A1 * | 11/2015 | Kubota | A61B 8/42 600/459 |
| 2018/0214125 A1 * | 8/2018 | Tola | A61B 8/4281 |
| 2019/0133554 A1 * | 5/2019 | Wagner | A61B 8/4281 |
| 2020/0061393 A1 * | 2/2020 | Lewis, Jr. | A61B 8/4411 |
| 2021/0177456 A1 * | 6/2021 | Vo | A61M 25/02 |
| 2021/0212661 A1 | 7/2021 | Valois et al. | |

OTHER PUBLICATIONS

International Search Report and Written Opinion of the International Searching Authority directed to International Patent Application No. PCT/IB2023/058543, mailed Oct. 24, 2023; 10 pages.

* cited by examiner

*Primary Examiner* — Anh Tuan T Nguyen
*Assistant Examiner* — Younhee Choi
(74) *Attorney, Agent, or Firm* — Sterne, Kessler, Goldstein & Fox P.L.L.C.

(57) ABSTRACT

An acoustic coupling device includes a base tape member having a hole, and a sensor side and a skin side each having an adhesive material thereon. The device further includes a tray removably attached to cover the skin side of the base tape member. The tray includes an indentation, which defines a concave face facing the hole, and a flat portion surrounding the indentation. The device further includes an ultrasound transferring gel disposed in the indentation, and a removable protective liner configured to cover the sensor side of the base tape member.

21 Claims, 3 Drawing Sheets

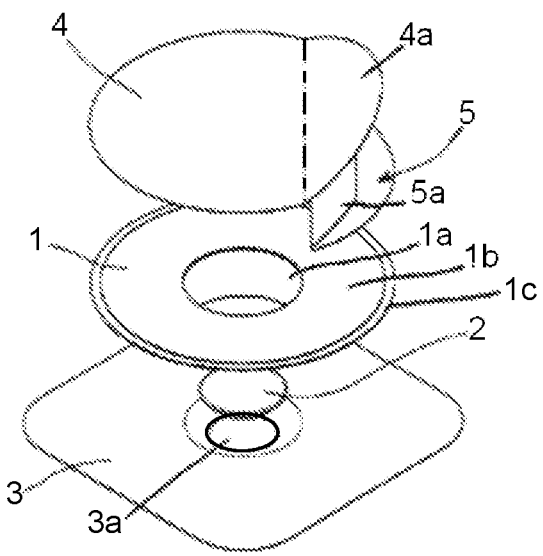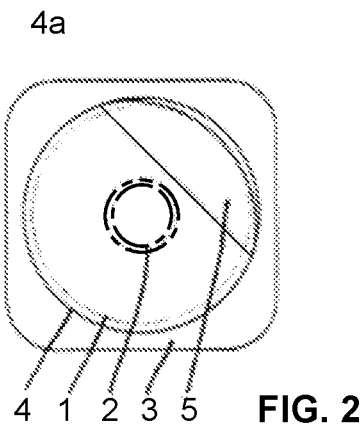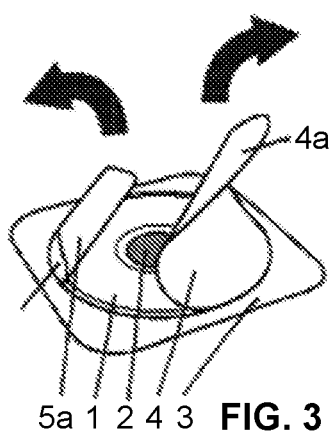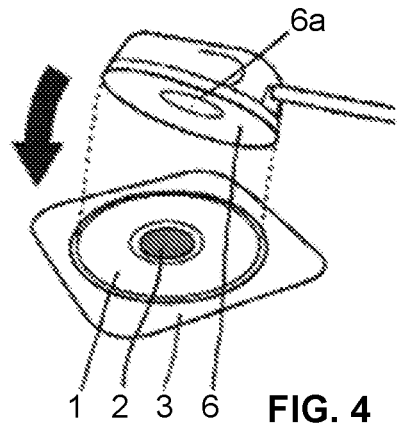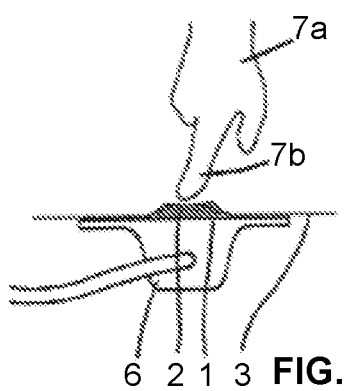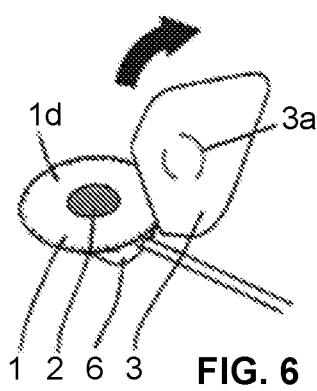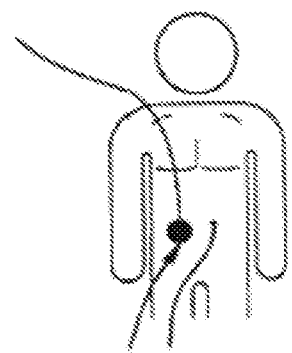

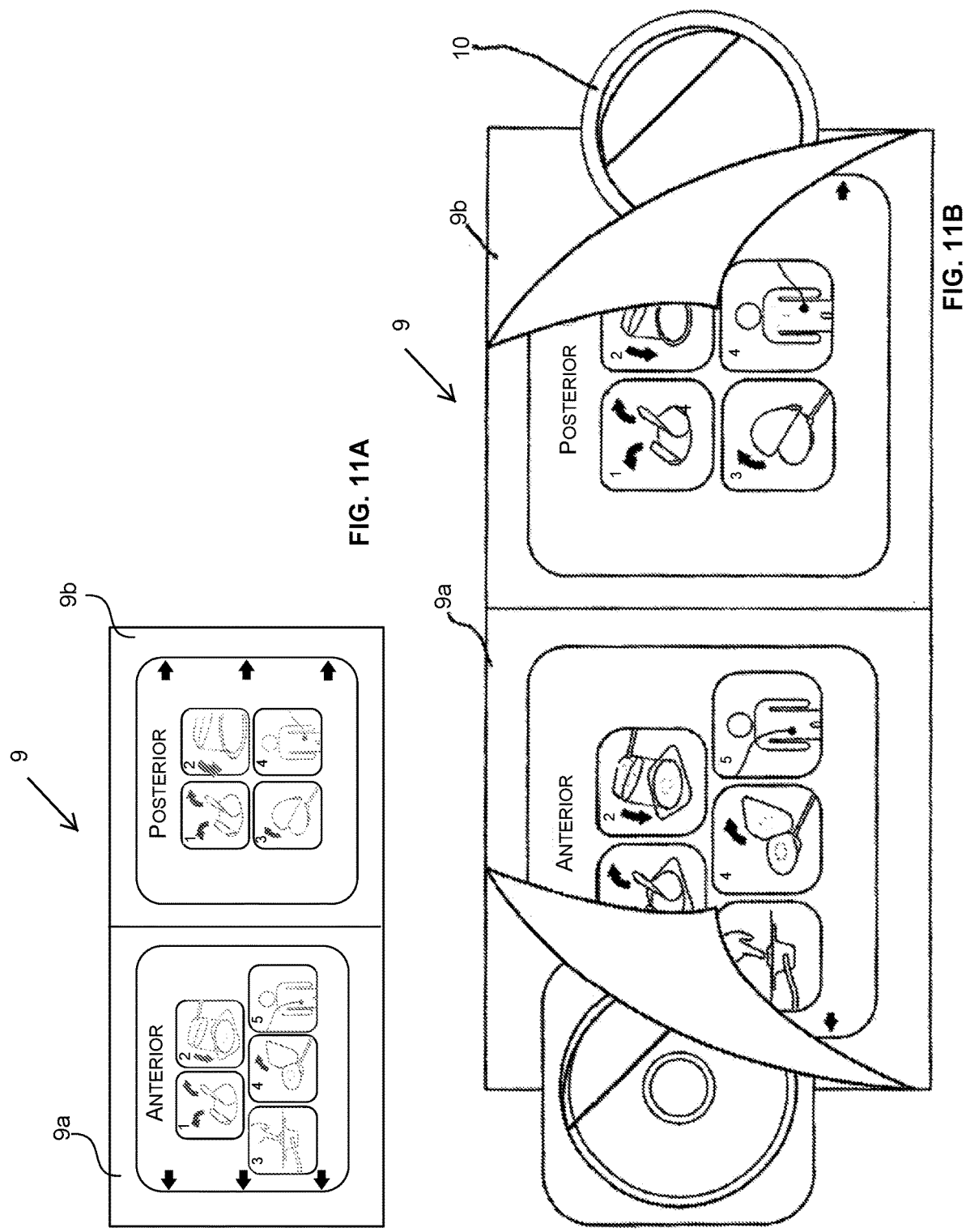

ACOUSTIC COUPLING DEVICE AND METHOD OF USING THE DEVICE

TECHNICAL FIELD

The present disclosure describes an acoustic coupling device and a method of using the device, and more particularly, an acoustic coupling device for securing coupling of an ultrasonic transceiver to a patient's skin for an ultrasound-based diagnostic imaging technique, and a method of using the same.

BACKGROUND

Ultrasound imaging or ultrasonography is an ultrasound-based diagnostic imaging technique used to visualize subcutaneous body structures including tendons, muscles, joints, vessels, and internal organs for possible pathology or lesions. Obstetric sonography is commonly used during pregnancy and is widely recognized by the public. Various other diagnostic and therapeutic applications are practiced in medicine.

In order to obtain a good quality image of the body structures of interest, it is necessary for the pulses of sound emitted by an ultrasound transceiver to be passed into the body and received from the body without interference. The materials that form the face of the transceiver are chosen to enable the sound to be transmitted efficiently into the body. Conventionally, a water-based gel (e.g., hydrogel) is placed between the patient's skin and the transceiver to ensure good acoustic coupling. The gel allows the transceiver to be moved over the skin whilst maintaining the desired acoustic coupling so that different areas can be imaged as required.

For example, U.S. Pat. No. 9,211,106 discloses securing an ultrasound probe to a patient's skin using a tape. However, further improvements are found to be necessary for acoustic coupling between the tape and the patient's skin. To ensure a reliable acoustic coupling, the tape requires a user to manually place a drop of ultrasound gel which is an inconvenience to the user, susceptible to user error. Moreover, it has proven to be challenging to manufacture the tape consistently.

As another example, an electrode pad may be used to assist in performing electrocardiograms (ECG or EKG). However, the conventional electrode pad requires an electrical connector or snap ring for a cable connection.

Thus, there exists a need for improved devices and methods of securing coupling of an ultrasonic transceiver to a patient's skin for an ultrasound-based diagnostic imaging technique while reducing user manipulation error and time.

SUMMARY

Aspects of the present disclosure are directed to securely attaching an ultrasonic sensor to a patient's skin in order to observe organ activity inside the body using a simple device, and a method of using the device.

An aspect of the present disclosure is directed to an acoustic coupling device for coupling an ultrasonic sensor to a skin surface of a patient. In a non-limiting aspect, the device may include: a base tape member having a sensor side and a skin side each having an adhesive material thereon, and a hole; a tray removably attached to cover the skin side of the base tape member, wherein the tray includes an indentation, which defines a concave face facing the hole, and a flat portion surrounding the indentation; a first ultrasound transferring gel disposed in the indentation; and a removable protective liner configured to cover the sensor side of the base tape member.

Another aspect of the present disclosure is directed to a method of using an acoustic coupling device to enable an ultrasonic sensor to be connectable to a skin surface of a patient. In a non-limiting aspect, the device may include: a base tape member having a sensor side and a skin side each having an adhesive material thereon, and a hole; a tray removably attached to cover the skin side of the base tape member, wherein the tray includes an indentation, which defines a concave face facing the hole, and a flat portion surrounding the indentation; an ultrasound transferring gel disposed in the indentation; and a removable protective liner configured to cover the sensor side of the base tape member. The method of using the acoustic coupling device may comprise the steps of: removing the protective liner from the base tape member; attaching the ultrasonic sensor to the sensor side of the base tape member; applying pressure onto the indentation of the tray to allow the ultrasound transferring gel to pass through the hole of the base tape member and to directly contact with a surface of the ultrasonic sensor; removing the tray from the base tape member to uncover the skin side of the base tape member; and attaching the skin side of the base tape member to the patient.

Still another aspect of the present disclosure is directed to a method of using an acoustic coupling device to enable an ultrasonic sensor to be connectable to a skin surface of a patient. In a non-limiting aspect, the device may include: a base tape member having a sensor side and a skin side each having an adhesive material thereon, a window-fitted hole; and a window configured to cover the window-fitted hole and composed of a material having sonolucent properties, a tray removably attached to cover the skin side of the base tape member and including an indentation, which defines a concave face facing the window-fitted hole, and a flat portion surrounding the indentation; a first ultrasound transferring gel disposed in the indentation; and a removable protective liner configured to cover the sensor side of the base tape member. The method of using the acoustic coupling device may comprise the steps of: removing the protective liner from the base tape member; attaching the sensor to the sensor-side of the base tape member; applying pressure onto the indentation of the tray to allow the first ultrasound transferring gel to contact the window; removing the tray off the base tape member to uncover the skin side of the base tape member; and attaching the skin side of the base tape member to the patient.

The acoustic coupling device according to various aspects configured as a tape assembly can achieve the following advantages:

1. Adhesion: the adhesive materials of the acoustic coupling device allow one side of the acoustic coupling device to adhere to the sensor surface of the ultrasonic sensor and the other side of the acoustic coupling device to adhere to the patient's skin by using one acoustic coupling device.
2. Biocompatibility: the adhesive material of the acoustic coupling device can be compatible with the patient's skin, avoiding irritation and other effects.
3. Biocompatibility barrier: the acoustic coupling device can provide a barrier to avoid a direct contact between the surface of the sensor and the patient's skin, avoiding irritation and other effects.
4. Sonolucency: the acoustic coupling device can transmit and receive ultrasound pulses without introducing significant interference, such that an acceptable acoustic response can be obtained from the body structure or structures of interest. The design and materials used can be selected not only for their own sonic transmission capabilities, but also to reduce or remove echoes and/or interference created by the transition between different layers within the acoustic coupling device, between the acoustic coupling device and the body tissue, and/or between the acoustic coupling device and the sensor surface. The adhesion formulations may be selected for their acoustic impedance in order to provide appropriate acoustic impedance matching with the adjacent skin or sensor surface.

Further features and advantages, as well as the structure and operation of various aspects, are described in detail below with reference to the accompanying drawings. It is noted that the specific aspects described herein are not intended to be limiting. Such aspects are presented herein for illustrative purposes only. Additional aspects will be apparent to persons skilled in the relevant art(s) based on the teachings contained herein.

BRIEF DESCRIPTION OF THE DRAWINGS

The accompanying drawings, which are incorporated herein and form a part of the specification, illustrate aspects and, together with the description, further serve to explain the principles and to enable a person skilled in the pertinent art to make and use the disclosure.

FIG. 1 illustrates an exploded view of an acoustic coupling device according to aspects of the present disclosure.

FIG. 2 illustrates a top view of the acoustic coupling device in an assembled state, according to aspects of the present disclosure.

FIG. 3 illustrates a perspective view of one side of the acoustic coupling device being uncovered, according to aspects of the present disclosure.

FIG. 4 illustrates a perspective view of securing an ultrasonic sensor onto the uncovered side of the acoustic coupling device, according to aspects of the present disclosure.

FIG. 5 illustrates a perspective view of applying ultrasound conveying gel onto a transceiver side of the ultrasonic sensor, according to aspects of the present disclosure.

FIG. 6 illustrates a perspective view of another side of the acoustic coupling device being uncovered, according to aspects of the present disclosure.

FIG. 7 illustrates the ultrasonic sensor attached to a patient's body by attaching the acoustic coupling device to a patient's skin, according to aspects of the present disclosure.

FIGS. 11A and 11B illustrate the acoustic coupling device being packaged in a pouch, according to aspects of the present disclosure.

DETAILED DESCRIPTION

Figure 8A:
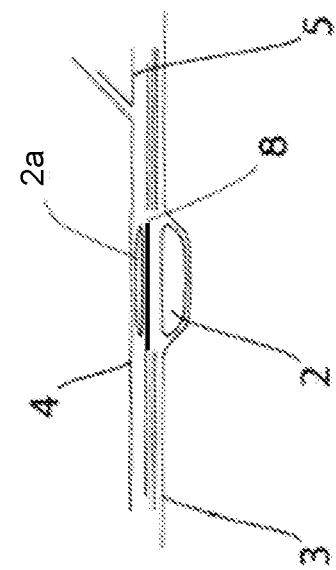
FIG. 8A illustrates a cross-section of an acoustic coupling device according to a first aspect as assembled.

The following Detailed Description refers to accompanying drawings to illustrate exemplary aspects consistent with the disclosure. References in the Detailed Description to "one exemplary aspect," "an exemplary aspect," "an example exemplary aspect," etc., indicate that the exemplary aspect described may include a particular feature, structure, or characteristic, but every exemplary aspect might not necessarily include the particular feature, structure, or characteristic. Moreover, such phrases are not necessarily referring to the same exemplary aspect. Further, when a particular feature, structure, or characteristic is described in connection with an exemplary aspect, it is within the knowledge of those skilled in the relevant art(s) to affect such feature, structure, or characteristic in connection with other exemplary aspects whether or not explicitly described.

The exemplary aspects described herein are provided for illustrative purposes, and are not limiting. Other exemplary aspects are possible, and modifications may be made to the exemplary aspects within the spirit and scope of the disclosure. Therefore, the Detailed Description is not meant to limit the disclosure. Rather, the scope of the disclosure is defined only in accordance with the following claims and their equivalents.

The following Detailed Description of the exemplary aspects will so fully reveal the general nature of the disclosure that others can, by applying knowledge of those skilled in relevant art(s), readily modify and/or adapt for various applications such exemplary aspects, without undue experimentation, without departing from the spirit and scope of the disclosure. Therefore, such adaptations and modifications are intended to be within the meaning and plurality of equivalents of the exemplary aspects based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

FIG. 1 illustrates, as a non-limiting embodiment, an exploded view of an acoustic coupling device according to aspects of the present disclosure, and FIG. 2 illustrates a top view of the acoustic coupling device in an assembled state, according to aspects of the present disclosure. The acoustic coupling device according to aspects of the present disclosure may include a base tape member 1 which comprises a plastic substrate with adhesive materials on both sides. As shown in FIG. 1, the base tape member 1 has a ring shape surrounding a hole 1a in the center. The hole 1a may be through-going or be fitted with a window, as will be discussed with reference to FIGS. 9 and 10. It will be appreciated that the base tape member 1 could have other shapes than a ring shape, such as e.g. polygonal or hexagonal shape. Further, the hole 1a does not necessarily need to be located at a center location of the base tape member 1. A ring 1b including a double-sided adhesive surrounds the hole 1a, and an edge region (or skirt region) 1c without adhesive then surrounds the ring 1b. One side of the base tape member 1 is a skin side 1d (see FIG. 6) on which a tray 3 can be removably attached as a protective liner for protecting the adhesive of the skin side 1d before attachment to a skin surface of a patient 7 (see FIG. 7). The tray 3 can be formed with a shallow indentation or blister 3a. The tray 3 can be suitably made from a plastic material, e.g. a semi-rigid plastic sheet, although a choice of material is not restricted thereto. The indentation 3a may be made to be resilient, flexible, or resilient and flexible.

Alternatively or in addition, the indentation 3a has a thickness thin enough to be deformable when a user applies a slight pressure. Further, the tray 3 may be composed of a flexible material, entirely or partially. The tray 3 can be manufactured by a thermo-forming process which is commonly used for manufacturing, e.g., blister packs for pills. In non-limiting aspects, the diameter of the indentation 3a may be in a range of, e.g., 10-25 mm, or more preferably 15 mm, although such a range is not to be construed as a limitation of the aspects. For instance, the diameter and the depth of the indentation 3a can be varied based on the amount of an ultrasound gel 2 to be deposited in the indentation 3a, which will be described in detail later in this disclosure, the size of an ultrasound transceiver, and the imaging location of a patient (e.g., abdomen, or any other body parts), etc. The indentation 3a may be in the form of a frustum of a cone or the form of a partial sphere. The angle can be manufactured in a different size in relationship with the diameter and depth of the indentation 3a to provide sufficient amount of the ultrasound gel 2 without forming any air bubbles inside the indentation 3a when attaching the device of the aspects to the ultrasonic sensor. The indentation 3a may include a central region approximately flat and parallel to the base tape member 1, as shown in, e.g., FIGS. 3, 5 and 8A-10B. Alternatively, the central region of the indentation 3a may have a slightly rounded shape, with a region of higher slope arranged between the central region and the surrounding base tape. The shape and the dimension of the indentation may relate to the amount of gel needed and can vary according to those of an ultrasonic sensor, ultrasound probe or the measurement location of the patient.

The acoustic coupling device according to aspects can further include a pair of flexible liners 4 and 5 for protecting the ring 1b at a sensor-side adhesive of the base tape member 1 as well as the hole 1a. The pair of flexible liners 4 and 5 may comprise two halves 4 and 5 with folded flaps 4a and 5a, respectively, to be easily gripped by a user for removal. In non-limiting aspects, the two halves 4 and 5 may have surface areas greater than those of the folded flaps 4a and 5a, respectively. In an alternative aspect, the acoustic coupling device may include a single liner covering the entire sensor-side adhesive, without or with a folded flap. In addition, the two halves 4 and 5 may be joined along their adjacent edges, with the flaps 4a and 5a forming a joined, unitary single flap.

A substrate of the base tape member 1 may be made of, e.g., silicone, polyethylene, polyester, acrylic, polyvinyl chloride, or any other suitable plastic materials, elastomers, or combination thereof. The adhesives of the base tape member 1 may be made of, e.g., silicone, acrylic, or any other types of suitable adhesives, but not limited thereto. Particularly and importantly without limiting the aspects, the base tape member 1 and the adhesives thereof include bio-compatible materials so as to prevent or reduce, if any, an allergic reaction to a patient. Further, the tray 3 can be made of a variety of materials, e.g., polyamide, polyethylene or any other suitable other plastics, or elastomers, or combination thereof without limiting thereto.

As described previously, the indentation or blister 3a has a shape in which a drop of standard ultrasound gel or hydrogel 2 can be securely contained in a shape. In non-limiting aspects, the gel 2 may be dispensed into the indentation 3a either before attaching the base tape member 1 onto the tray 3, or through the hole 1a after attachment of the base tape member 1 onto the tray 3. The ultrasound gel 2 may contain, e.g., glycerin, propylene glycol, water, or other suitable ingredients for use in ultrasound scanning.

FIGS. 3-7 illustrate the application of the tape member of the acoustic coupling device according to aspects of the present disclosure in clinical use. First, a user may remove the acoustic coupling device from a package in the form of pouch (see FIGS. 11A and 11B). The user then peels off the liners 4 and 5 by pulling the folded flaps 4a and 5a outwardly as shown in FIG. 3, or a single liner as described above as an alternative aspect.

Referring to FIG. 4, the user then attaches an ultrasonic probe or more specifically an ultrasonic sensor 6 of the probe to the sensor side, which is uncovered by removing the liners 4 and 5, of the base tape member 1. Since the base tape member 1 has the hole 1a axially penetrating through, the ultrasound gel 2 can be exposed outside and directly contact a probe face 6a of the sensor 6.

Next, with reference to FIG. 5, the user may exert pressure on the indentation 3a by use of a finger 7b of the user's hand 7a, or by use of an equivalent tool, so as to squeeze the gel 2 out of the indentation 3a onto the face 6a of the sensor 6. This wets the face 6a of the sensor 6, providing an improved acoustic coupling between the sensor 6 and the gel 2. Due to the firmness of the gel 2 and the surface characteristics of the indentation 3a, enough amount the gel 2 can be squeezed out from the indentation 3a to wet the face 6a of the sensor. When the user peels off the tray 3 as shown in FIG. 6, although the tray 3 may have a surface to which the gel 2 does not substantially adhere, a portion of the gel 2 may nevertheless remain on the tray 3. However, this residual amount of gel 2 on the tray 3 is insignificant such that the gel 2 remaining on the transceiver face 6a of the sensor 6 provides sufficient gel to provide contact with the patient's skin. The gel 2 thus provides a direct coupling from the sensor 6, and more specifically from the transceiver face 6a, to the skin of the patient 7.

The user can then peel the tray 3 off from the base tape member 1 to uncover the skin side 1d thereof. Finally, the user can couple the skin side 1d to the skin of the patient, e.g., on the patient's abdomen as illustrated in FIG. 7, for scanning a particular interest of the body structure. However, the scanning location is not limited thereto, such that the user can place the sensor 6 with the tape base member 1 on any location on the body for scanning, e.g., the head, chest, neck, etc. with an appropriate ultrasonic sensor, as also described above. That is, the acoustic coupling device according to various aspects can be used for any ultrasonic sensor having the dimension and surface capable of adhering the base tape member 1 of the acoustic coupling device. In addition, the acoustic coupling device according to various aspects can be used for an ultrasound probe having an ultrasound transceiver coupled to the patient's body such that an ultrasound beam angle emitted from the ultrasound transceiver may be non-perpendicular to a motion vector of an internal structure inside the patient's body, e.g., at an angle of or below 45° (see FIGS. 8B, 9B and 10B). However, the acoustic coupling device according to various aspects can be used for any ultrasound beam angle such that the angle may be greater or smaller than, e.g., 45°, in the range 0-90°.

In alternative aspects, the base tape member 1, instead of being composed of a single double-sided adhesive as described above, may have a sandwiched construction of multiple double-sided adhesives. The double-sided adhesive can include a film serving as a substrate, with a layer of adhesive on each face. In a further alternative aspect, two double-sided adhesive films may be attached to each other. Thus, if each film has an adhesive layer on each face of a substrate, the base tape member 1 can include a total of six layers, or more. In this case, commercially available adhesive layer can be used to form the layered-structure, and thus, the manufacturing cost and time can be reduced.

Figure 9A:
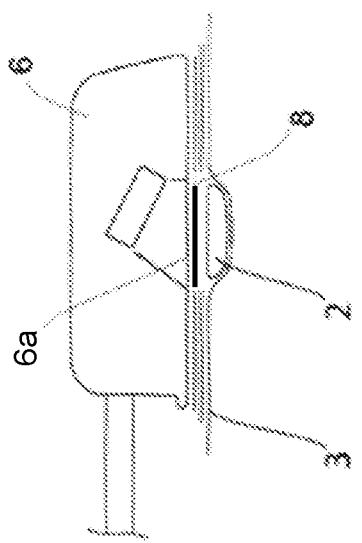
FIG. 9A illustrates a cross-section of an acoustic coupling device according to a second aspect as assembled.
Figure 9B:
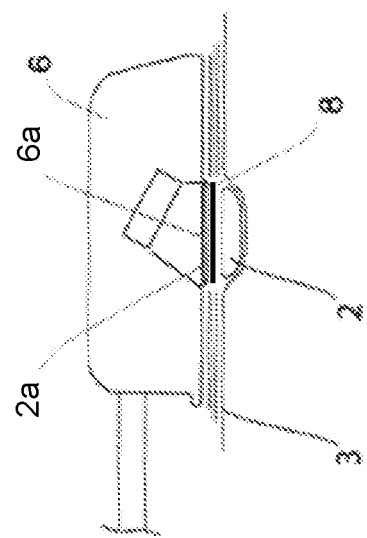
FIG. 9B illustrates a cross-section of the acoustic coupling device according to the second aspect being secured to an ultrasonic sensor.

FIGS. 9A and 9B illustrate a second aspect, or first alternative aspect, of the present disclosure. In the second aspect, the hole 1a of the base tape member 1 has a window 8 therein of a material having sonolucent properties, thereby providing a sonolucent path from the ultrasound-transceiver face 6a of the sensor 6 via the window 8 to the gel 2 which is to contact the skin, without direct contact between the face 6a and the gel 2. The term "sonolucent" can be understood as unique properties for allowing passage of ultrasonic waves without production of echoes that are due to reflection, attenuation, diffraction, or any other perturbation of some of the waves, and a material having sonolucent properties can be any ultrasound transparent material generally used in ultrasound scanning. Thus, the detailed description of a material with sonolucent properties is omitted herein.

The window 8 may be an area on one of base tape member layers, or the entire base tape member 1 itself may be made of a sonolucent material, such that the hole 1a may no longer be a hole passing through but covered or interrupted by the window 8. Accordingly, the gel 2 can be secured in the indentation 3a and the contact with the liners 4 and 5 can be prevented without losing any gel when removing the liners 4 and 5. Alternatively, the window 8 could be made by removing specific materials to retain only the sonolucent properties, e.g., by omitting an adhesive layer on the hole 1a area during a manufacturing process of the base tape member 1 or removing the adhesive layer in a subsequent manufacturing step, from the base tape member 1. As a further alternative, or in addition to the above aspects, the base tape member 1 may have a layered structure. The number of layers that the base tape member 1 can have is not limited to the example herein (e.g., three layers), but can be any number. Each layer may have adhesive on both sides to adhere to each other.

Figure 10A:
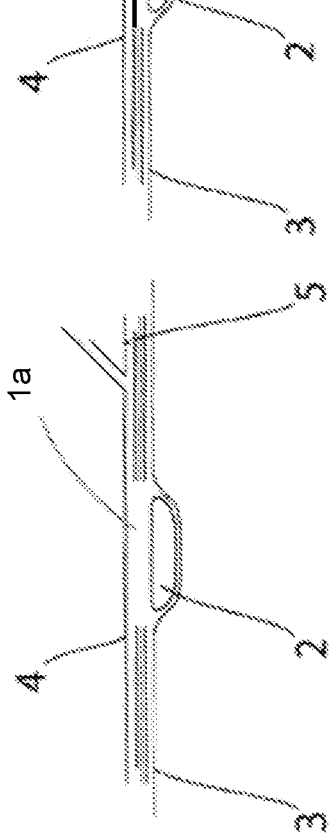
FIG. 10A illustrates a cross-section of an acoustic coupling device according to a third aspect as assembled.
Figure 8B:
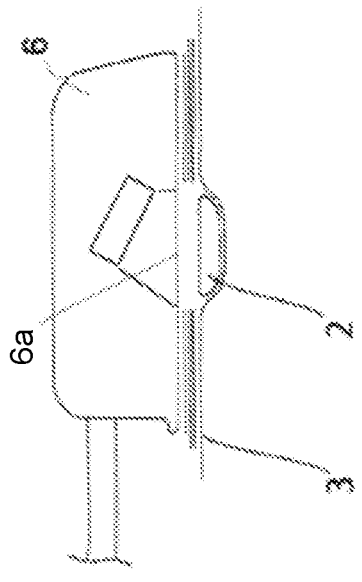
FIG. 8B illustrates a cross-section of the acoustic coupling device according to the first aspect being secured to an ultrasonic sensor.
Figure 10B:
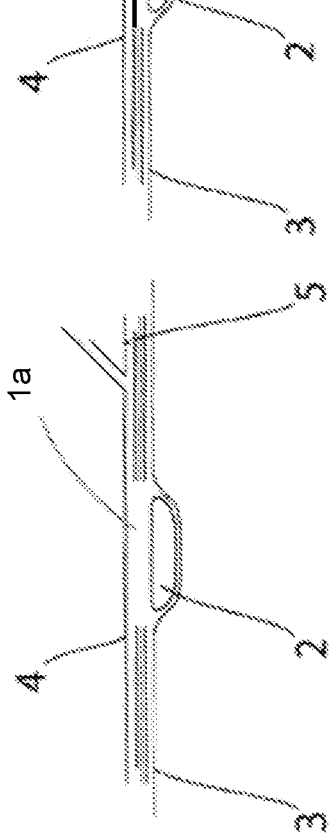
FIG. 10B illustrates a cross-section of the acoustic coupling device according to the third aspect being secured to an ultrasonic sensor.

In a third aspect, or a second alternative aspect, as shown in FIGS. 10A and 10B, an additional drop of ultrasound conveying gel or hydrogel 2a may be packaged or disposed between the window 8 of the base type member 1 and the liners 4 and 5 so as to provide ultrasound gel directly on the face 6a of the sensor 6. That is, the additional gel 2a may be provided on top of the window 8 to have the gel directly contacting the surface of the face 6a since air pockets (e.g., air bubbles or spaces) may be formed or trapped between the window 8, disposed proximal to the sensor side, and the face 6a when the sensor 6 is applied onto the adhesive sensor-side of the base type member 1. It will be appreciated that the window 8 and the additional gel 2a in this case may be at a central or dedicated portion of the sensor-side layer of the base tape member 1, corresponding the hole 1a. Thus, the additional drop of gel 2a can reduce air between the sensor 6 and the window 8.

FIGS. 11A and 11B illustrate a pouch in which the acoustic coupling device according to the various aspects is packaged to be shipped. A pouch 9 can securely seal and maintain the acoustic coupling device as originally packaged without any damage during transport and storage. Further, a user can easily open and remove the acoustic coupling device according to the various aspects without damaging the device. The pouch 9 may be made of a combination of plastics, metal foils, and paper. In non-limiting aspects, the acoustic coupling device may be packaged in one package or a dual package as shown in FIGS. 11A and 11B. FIG. 11B illustrates, as a non-limiting embodiment, that the sealed pouch 9 may include a pouch part 9a for storing one acoustic coupling device, whereas a pouch part 9b may store a different coupling device 10 or another acoustic device of various aspects.

For example, when the dual package is used, the user can open and remove each coupling device by peeling off the left corner of a liner for the left pouch part 9a and peeling off the right corner of a liner for the right pouch part 9b as shown in FIG. 11B. However, this is merely an example so that the user may peel off the middle portion between the pouches 9a and 9b to open. The acoustic coupling device of the various aspects as described above may be used for the anterior location on a patient. On the other hand, the different coupling device 10 may be a commercially available coupling device or another coupling device to be used on the posterior side of the patient to provide for movement compensation based transceiver in co-operation with the sensor 6 (e.g., U.S. Pat. Nos. 10,398,351 and 10,505,821). Alternatively, there may be the acoustic coupling device of the aspects packaged in each pouch part such that one device of various aspects can be used for the anterior location and the other device of various aspects can be used for the posterior location. It will be appreciated that the base tape member 1 of the aspects may be sold separate from the different coupling device 10, and in this case, no dual packaging will be provided. As noted from the front of the dual packaging, a visual user manual may be provided on the front side of the packaging.

It is to be appreciated that the Detailed Description section, and not the Summary and Abstract sections, is intended to be used to interpret the claims. The Summary and Abstract sections may set forth one or more but not all exemplary aspects of the present disclosure as contemplated by the inventor(s), and thus, are not intended to limit the present disclosure and the appended claims in any way.

Aspects of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific aspects will so fully reveal the general nature of the disclosure that others can, by applying knowledge within the skill of the art, readily modify and/or adapt for various applications such specific aspects, without undue experimentation, without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary aspects, but should be defined only in accordance with the following claims and their equivalents.

What is claimed is:

1. An acoustic coupling device for securing an ultrasonic sensor to a patient, the acoustic coupling device comprising:

a base tape member comprising a sensor side having an adhesive material thereon to enable removable attachment of the sensor and a skin side having an adhesive material thereon enabling removable attachment to a skin face of the patient, wherein the base tape member includes a hole;
a tray removably attached to cover an entirety of the skin side of the base tape member, wherein the tray includes a deformable indentation being a unitary part of the tray, the deformable indentation having a concave face facing the hole, and the tray further including a flat portion surrounding the deformable indentation;
a first ultrasound transferring gel disposed in the deformable indentation, the first ultrasound transferring gel movable into the hole upon application of pressure onto the deformable indentation in direction of the hole; and
a removable protective liner configured to cover the sensor side of the base tape member prior to said removable attachment of the ultrasonic sensor.

2. The acoustic coupling device of claim 1, wherein the base tape member further comprises:
a window arranged to correspond to and cover the hole, wherein the window is disposed proximal to the sensor side of the base tape member.

3. The acoustic coupling device of claim 2, wherein the first ultrasound transferring gel is disposed in the deformable indentation and adjacent to a surface of the window away from the removable protective liner.

4. The acoustic coupling device of claim 3, wherein a second ultrasound transferring gel is disposed between the window and the removable protective liner.

5. The acoustic coupling device of claim 2, wherein the base tape member has a multilayered structure, and wherein each layer in the multilayered structure has an adhesive material on each side, the adhesive materials of the multilayered structure are configured to adhere the layers in the multilayered structure to each other.

6. The acoustic coupling device of claim 5, wherein at least one layer of the multilayered structure having the window includes a sonolucent material axially aligned with the hole of the base tape member.

7. The acoustic coupling device of claim 6, wherein one or more layers of the multilayered structure other than the at least one layer having the sonolucent material have a through-hole axially aligned with the hole of the base tape member.

8. The device of claim 1, wherein the base tape member has a multilayered structure.

9. The acoustic coupling device of claim 1, wherein a location of the deformable indentation on the tray is disposed to correspond to a location of the hole of the base tape member.

10. The acoustic coupling device of claim 1, wherein the base tape member further comprises:
an edge region surrounding the base tape member at an outer edge, wherein the edge region is disposed without adhesive material to surround the sensor side and the skin side of the base tape member having the adhesive materials thereon.

11. The acoustic coupling device of claim 1, wherein the base tape member includes at least one of a plastic material, an elastomer material, a bio-compatible material, or a silicone type material.

12. The acoustic coupling device of claim 1, wherein the tray includes at least one of a plastic material or an elastomer material.

13. The acoustic coupling device of claim 1, wherein the deformable indentation is configured to be at least one of resilient or flexible.

14. The acoustic coupling device of claim 13, wherein the deformable indentation has a diameter in a range of 10-25 millimeters and a depth in a range of 1-20 millimeters.

15. The acoustic coupling device of claim 14, wherein the deformable indentation has a frustum of cone shape or of a spherical cap shape.

16. The acoustic coupling device of claim 1, wherein the removable protective liner comprises plastic liner members, each of which has a gripping flap.

17. The acoustic coupling device of claim 1, wherein the adhesive material on the skin side of the base tape member includes a bio-compatible material.

18. The acoustic coupling device of claim 1, wherein the tray is made by thermoforming material thereof.

19. A method of utilizing an acoustic coupling device for securing an ultrasonic sensor to a patient, wherein the acoustic coupling device comprises:
a base tape member comprising a sensor side having an adhesive material thereon to enable removable attachment of the ultrasonic sensor and a skin side having an adhesive material thereon enabling removable attachment to a skin face of the patient, wherein the base tape member includes a hole which penetrates the base tape member from the sensor side to the skin side;
a tray removably attached to cover an entirety of the skin side of the base tape member, wherein the tray includes a deformable indentation being a unitary part of the tray, the deformable indentation having a concave face facing the hole, and the tray further including a flat portion surrounding the deformable indentation;
an ultrasound transferring gel disposed in the deformable indentation, the ultrasound transferring gel movable into the hole from the deformable indentation; and
a removable protective liner configured to cover the sensor side of the base tape member prior to said removable attachment of the ultrasonic sensor,
the method comprising steps of:
removing the removable protective liner from the base tape member;
adhesively attaching the ultrasonic sensor to the sensor side of the base tape member;
applying pressure onto the deformable indentation of the tray in direction of the hole to allow the ultrasound transferring gel to pass and extend through the hole of the base tape member and to directly contact with a surface of the ultrasonic sensor;
removing the tray from the base tape member to uncover the skin side of the base tape member; and
adhesively attaching the skin side of the base tape member to the patient.

20. A method of utilizing an acoustic coupling device for securing an ultrasonic sensor to a patient, wherein the acoustic coupling device comprises:
a base tape member comprising a sensor side having an adhesive material thereon to enable removable attachment of the ultrasonic sensor and a skin side having an adhesive material thereon enabling removable attachment to a skin face of the patient, wherein the base tape member includes a window-fitted hole;
a window disposed to cover the window-fitted hole and composed of a material having sonolucent properties;
a tray removably attached to cover an entirety of the skin side of the base tape member, wherein the tray includes a deformable indentation being a unitary part of the tray, the deformable indentation having a concave face facing the window-fitted hole, and the tray further including a flat portion surrounding the deformable indentation;

a first ultrasound transferring gel disposed in the deformable indentation, the first ultrasound transferring gel movable into the window-fitted hole from the deformable indentation; and a removable protective liner configured to cover the sensor side of the base tape member prior to said removable attachment of the sensor, the method comprising steps of:

removing the removable protective liner from the base tape member;

adhesively attaching the ultrasonic sensor to the sensor side of the base tape member;

applying pressure onto the deformable indentation of the tray in direction of the window-fitted hole to allow the first ultrasound transferring gel to enter the window-fitted hole and to contact the window;

removing the tray off the base tape member to uncover the skin side of the base tape member; and adhesively attaching the skin side of the base tape member to the patient.

21. The method of claim 20, wherein the acoustic coupling device further comprises a second ultrasound transferring gel between the removable protective liner and the window, and wherein the method further comprises providing ultrasound transferring contact between the sensor side of the ultrasonic sensor and the window by use of the second ultrasound transferring gel after the step of attaching the ultrasonic sensor to the sensor side of the base tape member.

* * * * *